Aug. 19, 1969     S. MITCHELL     3,461,995
INFLATABLE ESCAPE CHUTES
Filed Nov. 8, 1967

Inventor
Sidney Mitchell
By Cushman, Darby & Cushman
Attorneys

United States Patent Office 3,461,995
Patented Aug. 19, 1969

1

3,461,995
INFLATABLE ESCAPE CHUTES
Sidney Mitchell, Farncombe, England, assignor to R.F.D. Company Limited, Godalming, England, a British company
Filed Nov. 8, 1967, Ser. No. 681,373
Claims priority, application Great Britain, Nov. 17, 1966, 51,582/66
Int. Cl. B64d 25/14; B63c 9/04
U.S. Cl. 193—25          6 Claims

ABSTRACT OF THE DISCLOSURE

This invention relates to inflatable escape chutes used in disembarking persons from aircraft in emergency situations. If an aircraft makes an emergency landing or crashes on land, the chute is used for its primary purpose of simply evacuating passengers from the aircraft exit. However it is also known to use an inflatable chute as a life raft in the event of the aircraft crashing into the sea.

---

Figure 1:
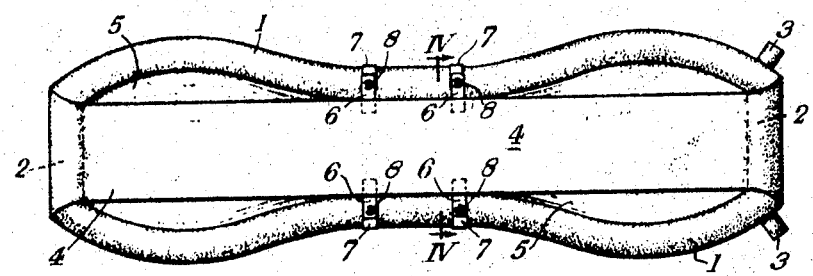

Conventional escape chutes, because of their shape, tend to be unstable in water and thus not ideally suited to use as life rafts. The present invention constitutes an improvement in this respect, the particular improvement being found in the inclusion of means for varying the spacing between inflatable side elements of the chute. Such means allows the chute to assume either one of two basic widths: a relatively narrow width when the chute is to be used as escape means, and a greater width, thus ensuring increased stability, when the chute is to be used as a life raft.

This invention relates to improvements in inflatable escape chutes such as may be used to evacuate passengers and crew from an aircraft in the event of an emergency landing. Whilst one purpose of an escape chute is to provide for the rapid evacuation of passengers from the exit of an aircraft, when the exit may be high above the ground, it has also been proposed to use an inflatable chute as a life raft in the event that the aircraft to which it is fitted crashes into the sea.

Whilst an inflatable chute designed for the evacuation of an aircraft on landing may have sufficient buoyancy to support a number of persons in the water, its long and narrow shape renders it unstable in water and thus not ideally suited for use as a life raft.

The object of the present invention is to provide a chute which while possessing the necessary stability when floating in water, will not be subject to an undue increase in bulk and wind resistance when it is serving its primary purpose as a chute between an aircraft and the ground.

According to the present invention an escape chute comprises an assembly of two inflatable side tubes and two inflatable transverse tubes which join the ends of said side tubes and are arranged to hold said ends in spaced relationship when all said tubes are inflated, a strip of flexible material secured to at least two opposed tubes of said assembly of tubes to form a slide extending along the length of the chute between said side tubes, and means for varying the relative spacing of said side tubes intermediate the ends thereof to render said chute suitable for use either as an escape chute or as a life raft.

Preferably, said side tubes when inflated and unrestricted are bowed outwardly so that the inflated assembly of tubes has a substantially boat-shaped outline and said means for varying the relative spacing of the side tubes are operative to draw a part of each side tube inwardly towards a corresponding part of the other side

2 tube so as to reduce the width of the assembly when the latter is required for use as an escape chute. The spacing between the side tubes in the operative condition of the means for varying such spacing, may with advantage be substantially equivalent to the width of the strip of flexible material which forms the slide.

The means for varying the relative spacing of the side tubes may comprise at least two tabs extending outwardly from opposed side edges of said strip. Flaps may be provided on the side tubes for releasable connection to said tabs, or alternatively a strap of flexible material may be provided to embrace the side tubes, for example at a position substantially midway between the ends thereof, and to be releasably connected at its ends to said tabs.

The area within the assembly of tubes is preferably covered with a sheet of flexible material which is sealed at its edges to the lowermost part of each tube of the assembly so as to form a floor below the slide.

Figure 2:
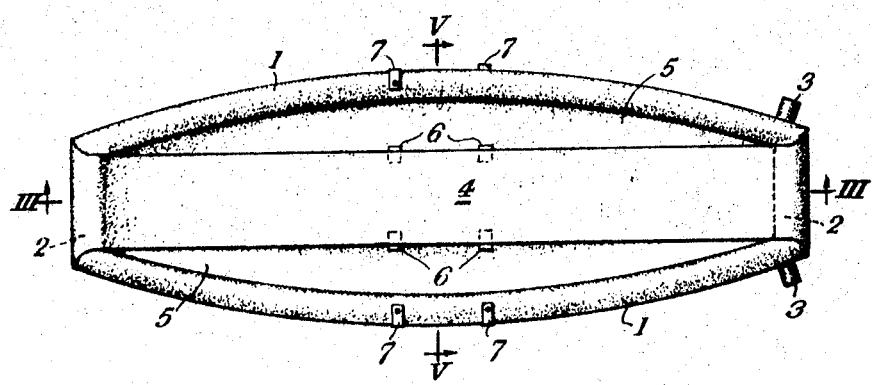
Figure 3:
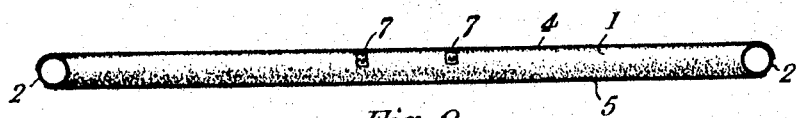
Figures 4, 6:
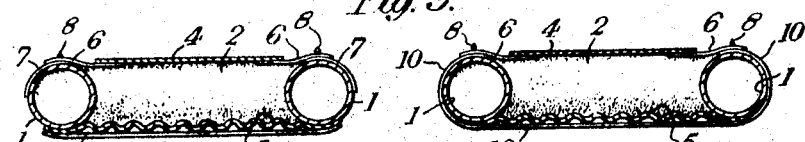
Figure 5:
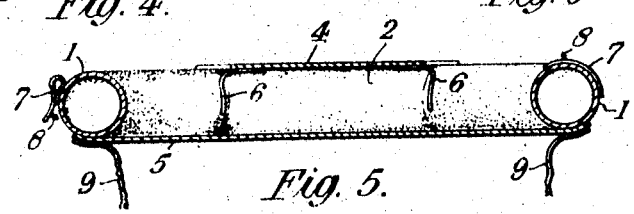

Two embodiments of the present invention will now be described by way of example with reference to the accompanying drawings in which:

FIG. 1 is a plan view of the chute in its restricted width, or escape chute, condition, FIG. 2 is a plan view of the chute of FIG. 1 but in its unrestricted, or life raft, condition, FIG. 3 is a diagrammatic longitudinal section through the chute, taken on the line III—III of FIG. 2, FIGS. 4 and 5 are diagrammatic cross-sectional views taken on the lines IV—IV and V—V of FIGS. 1 and 2, respectively, and FIG. 6 is a cross-sectional view corresponding to FIG. 4 but showing the chute held in its restricted condition by means other than those illustrated in the earlier figures.

It will be observed that FIGS. 4 to 6 are, for ease of understanding, drawn to a larger scale than FIGS. 1 to 3.

The chute comprises an assembly of two inflatable side tubes 1 and two inflatable transverse tubes 2 which join the ends of the side tubes and hold the latter tubes apart from each other when the assembly is inflated. The side and transverse tubes 1 and 2 communicate with each other so that all these tubes can be simultaneously inflated when the chute is required to be projected from its stowage in an emergency.

That end tube 2 which is intended for location at the inboard end of the chute is extended laterally of the chute to form trunnions 3 and is provided with releasable means (not shown) for coupling the chute to the aircraft. It is preferred to effect the coupling so that in an emergency a stream of liquid or foam from the fire prevention system of the aircraft is diverted down the chute; this arrangement not only reduces the fire risk to persons on the chute but also reduces friction thereon. It is preferred in practice to provide the chute also with means (for example, a perforated hose) for distributing liquid or foam on to the ground in the vicinity of the chute; this means is not illustrated in the accompanying drawings but will be readily envisaged.

A strip of flexible material 4 is attached at its ends to the upper part of the respective transverse end tubes 2 so as to form a slide which extends the length of the chute. In order to render the chute more suitable for use as a life raft the area inside the assembly of tubes 1, 2 is covered with a sheet of flexible material 5 which is sealed at its edges to the lowermost part of the tubes 1 and 2 so as to form a floor beneath the slide 4.

The side tubes 1 are shaped so as to bow naturally outwards when inflated and cause the assembly of tubes 1, 2 to assume a boat shape such as will possess an inherent degree of stability when floating in water and thus be suitable for use as a life raft. This natural or unrestricted shape of the chute is illustrated in FIG. 2. Such a boat shaped profile when the raft is viewed in plan is not, however, a suitable shape for a chute, when this is required primarily for use as an escape means from an aircraft which has landed in an emergency or has crashed on land.

In order, therefore, to render the chute more suitable for use as escape apparatus, means are provided for drawing the side tubes 1 towards one another and out of the position which they naturally assume on inflation. One embodiment of such means is illustrated in FIGS. 1 to 5 where it comprises two pairs of tabs 6 which are secured by stitching to the slide 4 and extend outwardly from opposed side edges of the slide; and two pairs of flaps 7 which are stitched to opposing side tubes 1 and are arranged to be releasably connected by press studs 8 to the tabs 6. It will be seen from FIGS. 1 and 4 that when the respective tabs and flaps are connected, the side tubes 1 are bowed inwardly to an extent such that they are spaced apart from each other by a distance substantially equivalent to the width of the slide 4.

In an alternative arrangement, not illustrated, each pair of tabs 6 may be replaced by an apron projecting from the side edge of the slide 4 in the region midway of its length. The aprons may be formed integrally with the slide and may have their laterally projecting edges faired into the longitudinal edges thereof, so as to reduce the risk of catching the fingers or clothing of a person travelling down the slide.

When distorted and restrained as described above, the side tubes 1 follow a sinuous path along each side of the slide 4 and convert the chute into a form which is sufficiently narrow and compact to be acceptable for use as an escape means. It will be seen from FIG. 4 that when the side tubes 1 are distorted and restrained, the sheet of material 5 forming the floor is gathered into shallow folds. In order to prevent the material 5 from sagging downwardly, it is necessary in practice to retain the folds in position by means of a bottom cross tie 9 which will readily rupture when the side tubes are released and allowed to spring outwardly into their natural positions.

When it is desired to use the chute as a life raft, it is released from the aircraft and the press stud connections between the tabs 6 and flaps 7 are released to allow the side tubes 1 to spring outwardly and assume their natural boat-shaped profile, as illustrated in FIG. 2.

A further example of means for varying the spacing between the side tubes 1, is illustrated in FIG. 6 where it can be seen that the flaps 7 of the first-described embodiment are replaced by a single strap 10 of flexible material which embraces the side tubes 1 and passes below the floor 5. The ends of the strap 10 are adapted to be releasably connected by press studs 8 to the previously described tabs 6, and in practice the strap 10 is positioned midway of the length of the chute so that when the side tubes 1 are restrained by the means 6, 8, 10, said tubes follow the same sinuous path which is illustrated in FIG. 1, the width of the strap 10 being substantially equal to the longitudinal distance between the flaps 7 in the latter figure.

It will be appreciated that in the FIG. 6 embodiment, release of the side tubes 1 from the confined position is effected in the same way as that described above in relation to the first embodiment; thus all that is necessary to effect such release is to disconnect the press stud connections between the tabs 6 and the ends of the strap 10.

It will be further appreciated that the press stud connections described above do not form an essential part of the invention and may be replaced by any other means (for example, quickly releasable lacing) by which the tabs 6 and flaps 7, or tabs 6 and strap 10, may be releasably interconnected.

What I claim as my invention and desire to secure by Letters Patent is:

1. An escape chute comprising an assembly of two inflatable side tubes and two inflatable transverse tubes which join the ends of said side tubes and are arranged to hold said ends in spaced relationship when all said tubes are inflated, a strip of flexible material secured to said transverse tubes to form a slide extendng along the length of the chute between said side tubes, and means for varying the relative spacing of said side tubes intermediate the ends thereof to render said chute suitable for use either as an escape chute or as a life raft.

2. An escape chute according to claim 1, wherein said side tubes when inflated and unrestricted are bowed outwardly so that the inflated assembly of tubes has a substantially boat shaped outline, and wherein said means for varying the relative spacing of the side tubes are operative to draw a part of each side tube inwardly towards a corresponding part of the other side tube so as to reduce the width of the assembly when the latter is required for use as an escape chute.

3. An escape chute according to claim 2, wherein the spacing between the side tubes in the operative condition of the means for varying such spacing, is substantially equivalent to the width of the strip of flexible material which forms the slide.

4. An escape chute according to claim 1, wherein the means for varying the relative spacing of the side tubes comprise at least two tabs extending outwardly from opposed side edges of said strip for releasable connections to flaps carried by the side tubes.

5. An escape chute according to claim 1, wherein the means for varying the relative spacing of the side tubes comprise at least two tabs extending outwardly from opposed side edges of said strip, and a strap of flexible material which is adapted to embrace the side tubes at a position substantially midway between the ends thereof and to be releasably connected at its ends to said tabs.

6. An escape chute according to claim 1, wherein the area within the assembly of tubes is covered with a sheet of flexible material which is sealed at its edges to the lowermost part of each tube of the assembly so as to form a floor below the slide.

References Cited

UNITED STATES PATENTS 3,092,232    6/1963    Adams    193—25
3,102,623    9/1963    Schacht et al.    193—25

ANDRES H. NIELSEN, Primary Examiner